(12) United States Patent
Carlsson

(10) Patent No.: US 11,161,147 B2
(45) Date of Patent: Nov. 2, 2021

(54) SYSTEM AND METHOD FOR ACOUSTIC TO ELECTRONIC TRANSDUCTION

(71) Applicant: The Trustees of Princeton University, Princeton, NJ (US)

(72) Inventor: Johan A. Carlsson, Princeton, NJ (US)

(73) Assignee: THE TRUSTEES OF PRINCETON UNIVERSITY, Princeton, NJ (US)

(*) Notice: Subject to any disclaimer, the term of this patent is extended or adjusted under 35 U.S.C. 154(b) by 271 days.

(21) Appl. No.: 16/270,787

(22) Filed: Feb. 8, 2019

(65) Prior Publication Data

US 2019/0240696 A1 Aug. 8, 2019

Related U.S. Application Data

(60) Provisional application No. 62/627,839, filed on Feb. 8, 2018.

(51) Int. Cl.
*B06B 1/02* (2006.01)
*H04B 11/00* (2006.01)

(52) U.S. Cl.
CPC ............ *B06B 1/0292* (2013.01); *H04B 11/00* (2013.01)

(58) Field of Classification Search
CPC .............................. B06B 1/0292; H04B 11/00
See application file for complete search history.

(56) References Cited

U.S. PATENT DOCUMENTS

| | | | | | |
|---|---|---|---|---|---|
| 3,523,275 | A | * | 8/1970 | Gross | H04R 19/00 367/107 |
| 3,718,970 | A | * | 3/1973 | Stanish | G01H 13/00 29/593 |
| RE27,693 | E | * | 7/1973 | Schafft | H03H 9/38 333/144 |
| 4,149,423 | A | * | 4/1979 | Frosch | G01L 9/0072 73/647 |
| 4,482,788 | A | | 11/1984 | Klein | |
| 5,610,477 | A | * | 3/1997 | Ivanov | H01J 17/30 313/234 |
| 8,861,312 | B2 | * | 10/2014 | Altman | G06Q 20/40145 367/181 |
| 9,445,202 | B1 | * | 9/2016 | Chyzhov | H04R 23/004 |
| 2001/0043704 | A1 | * | 11/2001 | Schwartz | H04R 29/001 381/98 |
| 2015/0350779 | A1 | * | 12/2015 | McNutt | G10K 11/002 381/71.1 |

(Continued)

OTHER PUBLICATIONS

Ph B'equin, Modeling of a corona discharge microphone, 2013, Journal of Physics D: Applied Physics, vol. 46, 1-8 (Year: 2013).*

(Continued)

*Primary Examiner* — Isam A Alsomiri
*Assistant Examiner* — Vikas Atmakuri
(74) *Attorney, Agent, or Firm* — Meagher Emanuel Laks Goldberg & Liao, LLP

(57) ABSTRACT

According to various embodiments, a system for acoustic to electronic transduction is disclosed. The system includes a transducing medium configured to convert a received acoustic signal into a transduced electronic signal when a voltage is applied. The system further includes a high-pass filter coupled to the transducing medium, the high-pass filter configured to isolate the transduced signal from the applied voltage.

17 Claims, 3 Drawing Sheets

(56) References Cited

U.S. PATENT DOCUMENTS

2016/0138991 A1* 5/2016 Gianchandani ....... G01L 9/0042
73/152.51

OTHER PUBLICATIONS

Akino, On the Study of the Ionic Microphone, 2014,J. Audio Eng. Soc., vol. 62, No. 4, pp. 254-264 (Year: 2014).*
Dl, Crecraft, S. Gergely, Analog Electronic Circuits, Systems and Signal Processing, pp. 233-262 (Year: 2002).*
Bequin et al.: "Modeling of a corona discharge microphone", Journal of Physics D: Applied Physics; vol. 46, Apr. 11, 2013.
Burt W. Blum, Ira Dyer, and Uno Ingard: "The Corona Discharge Transducer", The Journal of the Acoustical Society of America 26, 139 (1954).
Dayton et al.: "Method for Detecting Weak Sound Waves in a Low Pressure Gas", Review of Scientific Instruments 34, 1451 (1963).
Fransson, F. and Jansson, E.V.: "Properties of the STL-ionophone transducer", STL-QPSR, vol. 12, No. 2-3, pp. 043-052, 1971.
Fransson, F.: "Experiments on flutes", STL-QPSR, vol. 13, No. 4, pp. 029-033, 1972.
Fransson, F. and Jansson, E.V.: "The STL-Ionophone: Transducer properties and construction", J. Acoust. Soc. Am., vol. 58, No. 4, Oct. 1975.
Jansson, E.V. and Sundberg, J.: "An application of the STL-ionophone as a microphone", STL-QPSR, vol. 10, No. 4, pp. 051-052, 1969.

* cited by examiner

SYSTEM AND METHOD FOR ACOUSTIC TO ELECTRONIC TRANSDUCTION

CROSS-REFERENCE TO RELATED APPLICATIONS

This application claims priority to provisional application 62/627,839, filed Feb. 8, 2018, which is herein incorporated by reference in its entirety. This application is also related to provisional application 62/484,125, filed Apr. 11, 2017, which is herein incorporated by reference in its entirety.

STATEMENT REGARDING FEDERALLY SPONSORED RESEARCH OR DEVELOPMENT

This invention was made with government support under Grant #DE-AC02-09CH11466 awarded by the Department of Energy. The government has certain rights in the invention.

FIELD OF THE INVENTION

The present invention relates generally to transduction of sound and ultrasound into electronic signals and, more particularly, to the use of a conducting gas or fluid with pressure-dependent electrical resistivity, contained in an electrically non-conducting envelope, as a contact microphone, to transduce sonic and ultrasonic waves propagating through solid or fluid media.

BACKGROUND OF THE INVENTION

Ultrasonic acoustic emissions, typically in the frequency range of 100 kHz to 1 MHz, can be spontaneously generated in solid materials as stress energy is released when destructive changes to the material structure occurs, for example material fatigue due to a cyclic load. Catastrophic structural failure can be predicted, under service conditions, by passively sensing these acoustic emissions and analyzing them.

Conventionally, a piezoelectric crystal is used as the transducing element of an acoustic-emission sensor. However, the sensitivity of piezoelectric crystals depends strongly on the acoustic frequency, with a narrow maximum at the resonance frequency of the crystal. To avoid signal distortion due to frequency-dependent sensitivity, the crystal can be tuned to a resonant frequency much above the acoustic-emission frequency range, but this mode of operation has a significantly reduced sensitivity. Piezoelectric crystals also have a limited temperature range of operation, with an upper limit of about 400° F. Piezoelectric crystals are also susceptible to irreversible transduction-performance degradation by neutron irradiation.

As such, there is a need for an ultrasonic-to-electronic transducer that has high and frequency-independent sensitivity and that tolerates extreme temperatures and neutron irradiation. Such a sensitive, low-distortion transducer would be useful for predicting structural failure by sensing acoustic emissions even in environments with extreme temperatures or neutron fluxes, such as a nuclear-reactor core or a nuclear-waste container.

SUMMARY OF THE INVENTION

According to various embodiments, a system for acoustic to electronic transduction is disclosed. The system includes a transducing medium configured to convert a received acoustic signal into a transduced electronic signal when a voltage is applied. The system further includes a high-pass filter coupled to the transducing medium, the high-pass filter configured to isolate the transduced signal from the applied voltage.

According to various embodiments, a method for acoustic to electronic transduction is disclosed. The method includes applying a voltage to a transducing medium to convert an acoustic signal received by the transducing medium into an electronic signal; and high-pass filtering the electronic signal to isolate the electronic signal from the applied voltage.

According to various embodiments, a system for acoustic to electronic transduction is disclosed. The system includes a transducing medium configured to convert a received acoustic signal into a transduced electronic signal when a voltage is applied. The transducing medium comprises at least two electrodes immersed in an ionized gas. The electronic signal is derived from a potential difference between the immersed electrodes when a voltage is applied and the potential difference is caused by pressure perturbation of an acoustic wave. The system further includes a high-pass filter coupled to the transducing medium, the high-pass filter configured to isolate the transduced signal from the applied voltage.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which.

DETAILED DESCRIPTION OF THE INVENTION

Generally disclosed herein is an acoustic-to-electronic transducer including three components: 1) an ionized gas, or similar medium, where the electrical resistivity has pressure dependence; 2) a pair of electrodes with different electric potential; and 3) a high-pass filter that extracts an oscillating perturbation from the voltage between the electrodes. Transduction occurs when an acoustic wave propagates between the electrodes through the ionized gas. The pressure perturbation of the acoustic wave changes the electrical resistivity. With a fixed voltage applied, the electric current between the electrodes varies oppositely to the electrical resistivity. With a fixed current drawn between the electrodes, the voltage varies with the electrical resistivity. The distance between the electrodes should be less than half the wavelength to resolve the acoustic wave. This requirement imposes an upper limit on the acoustic-wave frequency that can be transduced. The current, or voltage, fluctuation is isolated by the high-pass filter and the resulting signal is a transduced acoustic wave.

Figure 1:
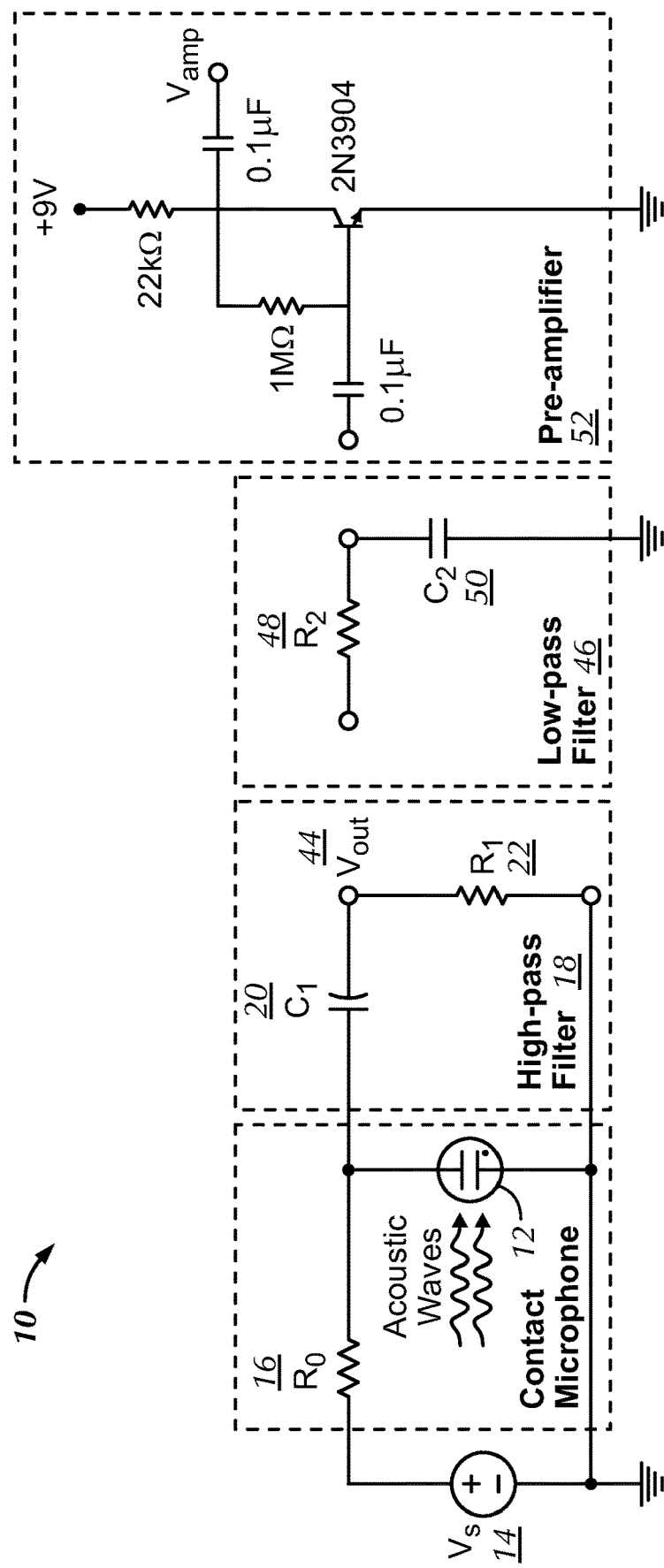
FIG. 1 depicts a schematic diagram of a contact microphone with a neon glow lamp as the transducing element according to an embodiment of the present invention.

A schematic diagram of an acoustic-to-electronic transducer 10 according to an embodiment of the present invention is shown in FIG. 1. The transducer 10 includes a transducing element 12 for the acoustic waves, such as a neon glow lamp, a voltage source $v_s$ 14 to ionize the neon gas and draw a current between the electrodes of the neon glow lamp 12, a ballast resistor $R_0$ 16 to set a stable operating point, and a high-pass filter 18 to separate the transduced signal from the DC voltage. The high-pass filter 18 may include a capacitor $C_1$ 20 coupled to a resistor $R_1$ 22.

The transducing medium 12 may be an electrically conducting gas, or fluid, with an electrical resistivity that depends on the pressure in the medium 12. An acoustic wave propagating through such a medium 12 can be transduced by inserting two electrodes into the medium and applying a voltage between them. For transducing media, the pressure perturbation of the acoustic wave translates into an electrical-resistivity perturbation. With a voltage source 14 creating the potential difference between the immersed electrodes, the electrical-resistivity perturbation causes the electric current that flows between the electrodes to fluctuate. With a current source creating the potential difference between the immersed electrodes, the electrical-resistivity perturbation causes the voltage between the electrodes to fluctuate. In either case, the fluctuation can be isolated by high-pass filtering and the resulting electronic signal represents a transduced version of the acoustic wave. The high-pass filtering can be achieved for example by an RC high-pass filter 18.

An example of a transducing medium 12 is a partially, or fully, ionized gas. A gas can be ionized inside an electrically non-conducting envelope by applying a sufficiently large voltage difference between two immersed electrodes, so that the breakdown voltage of the gas is exceeded. In a transducing element 12, the same electrode pair can be simultaneously used to create ionization and to drive the electric current needed for the transduction process, as described above.

Figure 2:
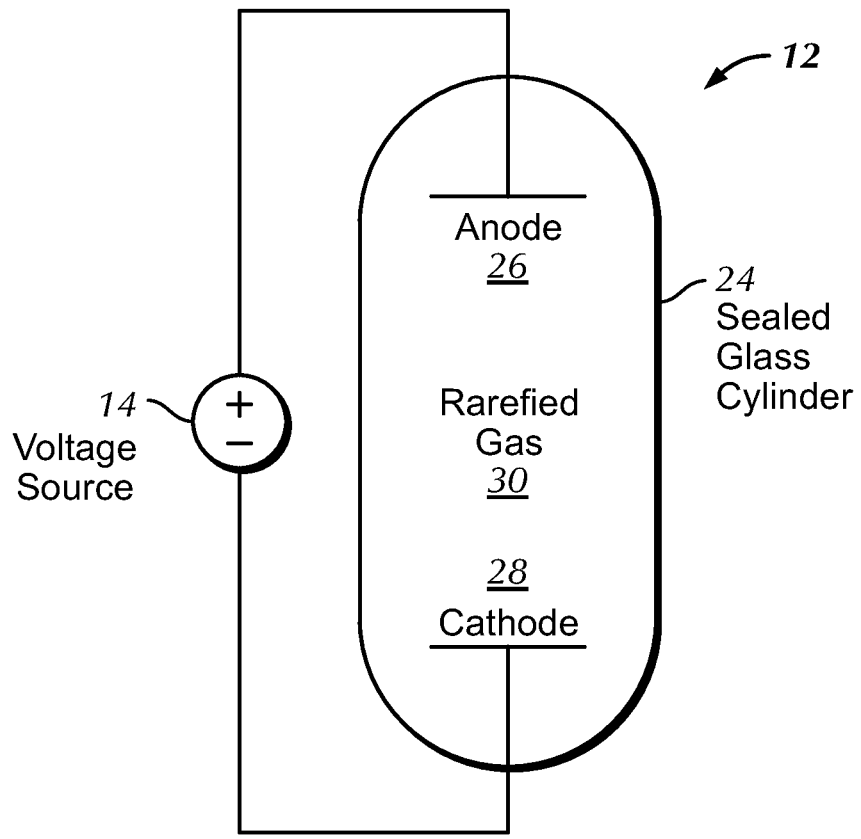
FIG. 2 depicts a schematic diagram of a gas discharge tube according to an embodiment of the present invention.

FIG. 2 depicts a schematic diagram of a gas discharge tube (GDT), which may be used as the transducing element 12 according to an embodiment of the present invention. The GDT may include a sealed container 24, such as a sealed glass cylinder, with electrodes (anode 26 and cathode 28) at opposite ends and filled with a rarefied gas 30 that becomes electrically conductive when the breakdown voltage of the gas 30 is exceeded. Nonlimiting examples of the gas 30 include a Penning mixture or helium.

A GDT 12 is a device including two (or more) electrodes 26, 28, immersed in a gas 30, and contained by an electrically non-conductive envelope 24, made of, for example, glass or ceramic. The electrodes 26, 28 penetrate the envelope 24 so that they can be connected to an external voltage or current source 14. If a potential difference, applied between the electrodes 26, 28, exceeds the breakdown voltage of the gas 30, the gas 30 becomes partially ionized and conducts electricity. GDTs 12 have many applications, including illumination (fluorescent lights, neon signs), surge protection of electronic circuits, and as indicator lights to show, for example, that an appliance is turned on.

Figure 3:
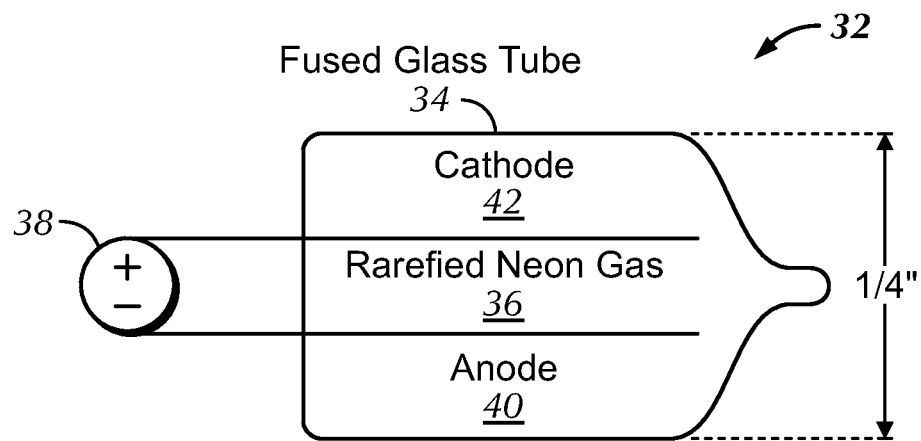
FIG. 3 depicts a schematic diagram of a neon glow lamp according to an embodiment of the present invention.

FIG. 3 depicts a schematic diagram of a neon glow lamp 32 according to an embodiment of the present invention. A neon glow lamp 32 is a GDT with a glass envelope 34 containing a Penning mixture 36 (neon with about 1% added argon), with a breakdown voltage that is less than the voltage from a voltage source 38. The neon glow lamp 32 is intended for use as an indicator light with a pair of wire electrodes (anode 40, cathode 42) parallel to the tube axis and entering the tube 34 on the same side.

When a neon glow lamp 32 is used as a transducing element 12, the relatively low breakdown voltage is an advantage, as it reduces injury risk and can be provided by a relatively simple power supply 14, powered by standard battery types.

Another significant advantage of the neon glow lamp 32 is its electrode configuration, with a pair of wire electrodes 40, 42 parallel to the tube axis. The electrode diameter and electrode-pair spacing limits the shortest wavelength that can be resolved. The relatively small diameter and narrow spacing of the electrodes in a neon glow lamp compared to other GDTs makes it possible to resolve shorter wavelength, and therefore higher frequencies. In a neon glow lamp, for a plane wave with normal incidence to the plane in which the electrodes are located, the shortest wavelength that can be resolved is twice the electrode diameter. For a plane wave with tangential incidence, the shortest resolvable wavelength is twice the electrode-pair spacing. However, plane waves incident at any angle are diffracted by the envelope and the electrodes and get a normal component with a resolution limit set by the electrode diameter. The upper limit of the frequency operating range can be increased by reducing electrode diameter and spacing, or by increasing the speed of sound in the gas. For a Penning mixture the electrode spacing can be reduced with only little increase of the breakdown voltage. The sound speed can be increased by ionizing the gas, or by modifying the electron energy distribution function if the gas is already ionized, by increasing the gas temperature, or by using a gas with smaller molecular mass.

GDT surge protectors have a ceramic envelope and are available with a range of breakdown voltages, as low as 70 V. A low-voltage GDT surge protector could also be conveniently used as a transducing element.

An example of a transducing-element power supply 14 is a switched-mode power supply including a battery-powered oscillator that drives a Greinacher (also known as Cockroft-Walton) voltage multiplier. For a standard quarter-inch-diameter NE-2 type neon glow lamp, with a breakdown voltage of approximately 75 V, a nine-stage voltage multiplier was found sufficient, when driven by an oscillator powered by a 9 V battery.

Figure 4:
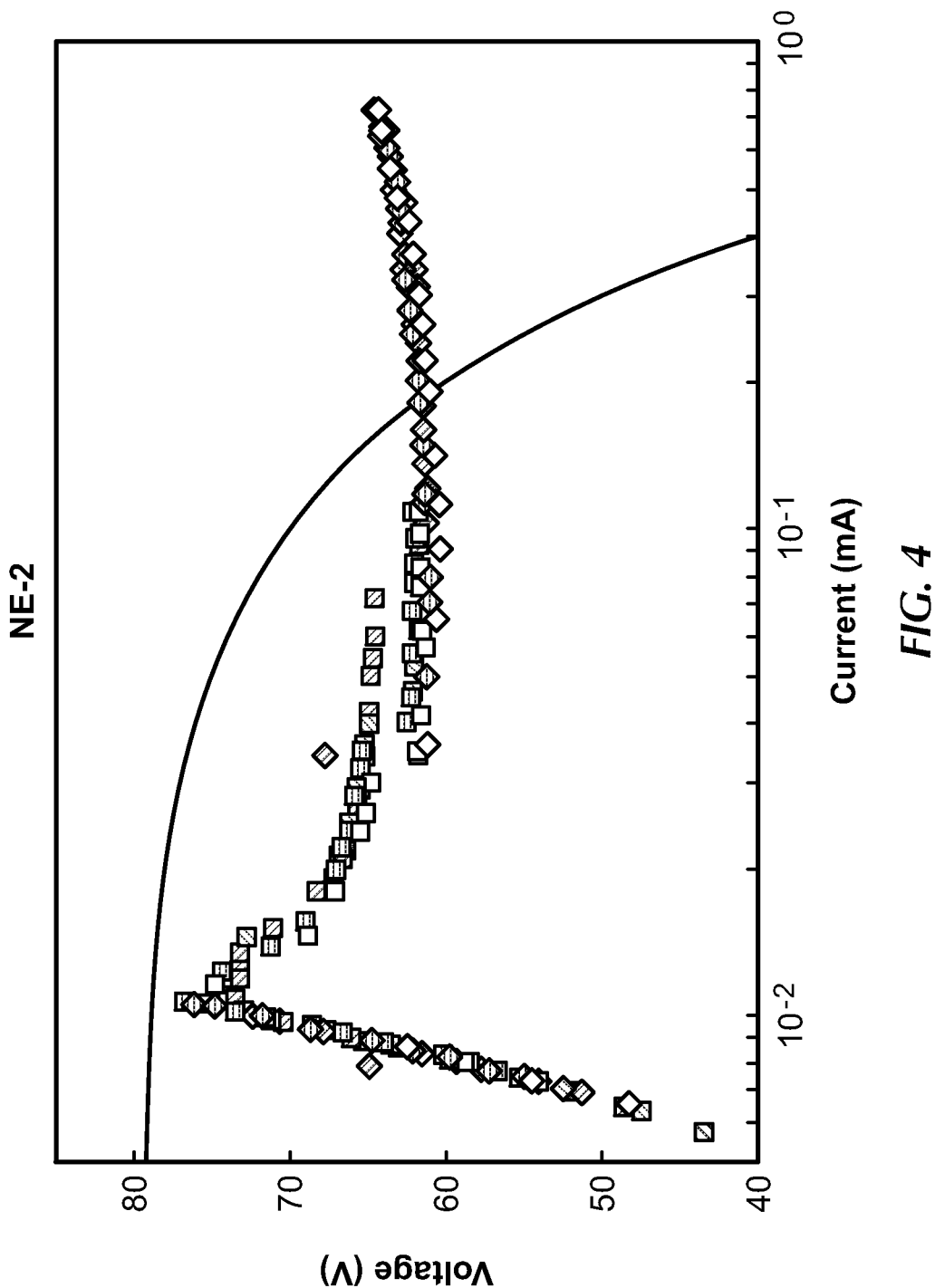
FIG. 4 depicts a graph of the voltage across the electrodes of a neon glow lamp versus the electric current flowing from anode to cathode according to an embodiment of the present invention.

FIG. 4 depicts a graph with measured values of voltage (V) across the electrodes of an NE-2 neon glow lamp for electric currents (I) ranging from a few μA to close to a mA according to an embodiment of the present invention. For currents below about 10 μA, the device is in the dark-discharge regime with large and almost constant electric resistivity. When the breakdown voltage of about 75 V is reached, a glow discharge is formed. For currents below about 100 μA, the glow-discharge voltage decreases with current. The part of the current-voltage characteristic with negative differential resistance is referred to as subnormal. For a normal glow discharge, with currents around 100 μA, the differential resistance is approximately zero. For an abnormal glow discharge, with currents of a few hundred μA or more, the differential resistance is positive. To set a stable operating point for the GDT transducing element, it should be operated at larger currents, as a normal, or abnormal, glow discharge. This can be achieved by placing it in series with a ballast resistor $R_0$ 16 of a suitable value.

The downward curve in FIG. 4 is the load line $V(I)=V_s-R_0I$ with $V_s=80$ V and $R_0=100$ kΩ. The point where the load line intersects the voltage-current characteristic is the operating point of the GDT, in this case about 62 V and 200 µA. Alternatively, the transducing element can be driven by a current source. To avoid interference with the transduced signal, the power supply can operate at a frequency above the frequency range of interest for acoustic emissions, typically at 1 MHz or above. The power-supply ripple voltage can then be suppressed by a low-pass filter 46 without loss of acoustic-emission signal information. The low-pass filter 46 may include a resistor $R_2$ 48 coupled to a capacitor $C_2$ 40 The transduced signal, isolated from the DC voltage between the electrodes by a high-pass filter 18 with cut-off frequency $f_c=1/(2\pi R_1 C_1)$, and optionally low-pass filtered to remove ripple voltage and other noise, is weak with a typical peak-to-peak voltage of less than one mV.

Referring back to the embodiment in FIG. 1, a signal $V_{out}$ 44 created by tapping the neon glow lamp transducing element 12 is faintly audible with a crystal earpiece. To boost the signal strength, and to transform the transducer impedance, a pre-amplifier 52 can be installed after the high-pass filter 18 and optional low-pass filter 46.

A proof-of-concept embodiment of the invention, powered by a 9 V battery and using a single-transistor pre-amplifier 52, generates a signal with peak-to-peak amplitude of a few hundred mV at both 440 Hz and 40 kHz, easily observable on an oscilloscope. An acoustic wave can be transferred to the transducer 10 from a solid object by ensuring good acoustic impedance matching by firmly attaching the transducer envelope to the object by, for example, using a metal strap and bolt, or a hard adhesive, such as epoxy glue. An acoustic wave can be transferred from a fluid by immersing the transducer 10 in the fluid.

The invention has at least three key advantages over piezoelectric transducers. 1) Its sensitivity is frequency independent. That is, the amplitude of the transduced signal depends on the on the amplitude of the acoustic wave, and not on its frequency. 2) It can operate in a wider temperature range. If the thermal expansion rates of the electrodes and the envelope are similar enough, the operating temperature could be as low as the condensation temperature of the gas, and as high as the melting point of the envelope. 3) It is extremely neutron-irradiation tolerant. The gas is unaffected by a neutron flux, and if made from an amorphous material, such as glass, so is the envelope. The metal electrodes are susceptible to neutron-irradiation embrittlement, but their mechanical weakening will not degrade transducer performance, as long as they remain electrically conducting. Possible failure modes are that the electrodes become so weakened that they break under their own weight, or that they swell enough to crack the glass tube.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A system for acoustic to electronic transduction, comprising:
    a transducing medium having an ionized gas and a pair of electrodes with a distance between the pair of electrodes being less than half a wavelength of an acoustic signal received by the transducing medium, the transducing medium configured to convert the received acoustic signal into a transduced electronic signal based on an electrical resistivity of the transducing medium when a fixed direct current (DC) voltage is applied to the transducing medium; and
    a high-pass filter coupled to the transducing medium, the high-pass filter configured to isolate the transduced electronic signal from the applied fixed DC voltage.

2. The system of claim 1, further comprising a power supply coupled to the transducing medium, the power supply configured to apply the fixed DC voltage to the transducing medium.

3. The system of claim 2, further comprising a ballast resistor coupled between the transducing medium and the power supply, the ballast resistor configured to set a stable operating point.

4. The system of claim 1, wherein the high-pass filter comprises a capacitor coupled to a resistor.

5. The system of claim 1, further comprising a low-pass filter coupled to the high-pass filter, the low-pass filter comprising a resistor coupled to a capacitor, the low-pass filter configured to remove noise from the transduced signal.

6. The system of claim 1, further comprising a pre-amplifier coupled to the high-pass filter, the pre-amplifier configured to boost the transduced signal.

7. The system of claim 1, wherein the pair of electrodes are immersed in the ionized gas, the transduced electronic signal being derived from a potential difference between the pair of electrodes when the fixed DC voltage is applied, the potential difference being caused by pressure perturbation of an acoustic wave which changes the electrical resistivity of the transducing medium to create the potential difference between the pair of electrodes.

8. The system of claim 1, wherein the transducing medium is a gas discharge tube comprising a sealed electrically non-conducting container filled with a rarefied gas that becomes electrically conductive when a breakdown voltage of the gas is exceeded.

9. The system of claim 8, wherein the gas discharge tube comprises at least one of a neon glow lamp and a surge protector.

10. The system of claim 8, wherein the rarefied gas comprises a Penning mixture with the breakdown voltage being less than the applied voltage.

11. A method for acoustic to electronic transduction, comprising:
    applying a fixed DC voltage to a transducing medium having an ionized gas and a pair of electrodes with a distance between the pair of electrodes being less than half a wavelength of an acoustic signal received by the transducing medium to convert the acoustic signal into a transduced electronic signal based on an electrical resistivity of the transducing medium; and
    high-pass filtering the electronic signal to isolate the transduced electronic signal from the applied fixed DC voltage.

12. The method of claim 11, further comprising stabilizing the applied fixed DC voltage via a ballast resistor.

13. The method of claim 11, further comprising removing noise from the electronic signal via a low-pass filter.

14. The method of claim 11, further comprising boosting the electronic signal via a pre-amplifier.

15. The method of claim 11, further comprising deriving the transduced electronic signal from a potential difference between the pair of electrodes when the fixed DC voltage is applied, the potential difference being caused by pressure perturbation of an acoustic wave which changes the electrical resistivity of the transducing medium to create the potential difference between the pair of electrodes.

16. A system for acoustic to electronic transduction, comprising:
   a transducing medium having a pair of electrodes immersed in an ionized gas with a distance between the pair of electrodes being less than half a wavelength of an acoustic signal received by the transducing medium, the transducing medium configured to convert the received acoustic signal into a transduced electronic signal based on an electrical resistivity of the transducing medium when a fixed direct current (DC) voltage is applied to the transducing medium, the electronic signal being derived from a potential difference between the pair of electrodes when the fixed DC voltage is applied, the potential difference being caused by pressure perturbation of an acoustic wave which changes the electric resistivity of the transducing medium to create the potential difference between the pair of electrodes; and
   a high-pass filter coupled to the transducing medium, the high-pass filter configured to isolate the transduced electronic signal from the applied fixed DC voltage.

17. The system of claim 16, wherein the transducing medium is a gas discharge tube comprising a sealed electrically non-conducting container having the pair of electrodes at opposite ends and filled with the gas that becomes electrically conductive when a breakdown voltage of the gas is exceeded.

* * * * *